United States Patent
Wang et al.

(10) Patent No.: US 10,069,922 B2
(45) Date of Patent: Sep. 4, 2018

(54) METHOD FOR PREVENTING VERIFICATION FLAW BY CONTROLLING SESSION TIME AND SESSION DATA TRAFFIC

(71) Applicant: D-Link Corporation, Taipei (TW)

(72) Inventors: Guo Yuan Wang, Taipei (TW); Fang-Yi Lin, Taipei (TW); Jiann Jyh Chen, Taipei (TW)

(73) Assignee: D-LINK CORPORATION, Taipei (TW)

( * ) Notice: Subject to any disclaimer, the term of this patent is extended or adjusted under 35 U.S.C. 154(b) by 94 days.

(21) Appl. No.: 15/435,330

(22) Filed: Feb. 17, 2017

(65) Prior Publication Data
US 2018/0198866 A1 Jul. 12, 2018

(30) Foreign Application Priority Data
Jan. 12, 2017 (TW) ............................... 106101002 A

(51) Int. Cl.
*G06F 15/16* (2006.01)
*H04L 29/08* (2006.01)
*H04L 12/26* (2006.01)

(52) U.S. Cl.
CPC .............. *H04L 67/14* (2013.01); *H04L 43/16* (2013.01); *H04L 67/10* (2013.01)

(58) Field of Classification Search
CPC .......... H04L 67/10; H04L 67/14; H04L 43/16
See application file for complete search history.

(56) References Cited

U.S. PATENT DOCUMENTS

| | | | |
|---|---|---|---|
| 9,967,260 B1* | 5/2018 | Gabriel | H04L 63/0876 |
| 2015/0082382 A1* | 3/2015 | Maguire | H04L 63/08 726/3 |
| 2016/0156593 A1* | 6/2016 | Yan | H04L 9/3228 726/4 |
| 2016/0373999 A1* | 12/2016 | Foster | H04W 4/02 |

* cited by examiner

*Primary Examiner* — Jonathan A Bui
(74) *Attorney, Agent, or Firm* — Bacon & Thomas, PLLC

(57) ABSTRACT

A method for preventing a verification flaw by controlling a session time and a session data traffic is applied to a networking equipment that stores a list of verified terminal devices, a temporary permit list, and a walled garden. When a terminal device is connected to the networking equipment, the networking equipment records the media information of the terminal device on the temporary permit list and starts recording a session time and session data traffic of the terminal device. Once the session time or session data traffic exceeds its upper limit (e.g., 10 minutes or 20 MB), the networking equipment cuts off connection with the terminal device, only when a frame received from the terminal device has a matching target address in the walled garden, the networking equipment will send the frame out therethrough. Thus, the terminal device, must be verified before it can access full network services.

12 Claims, 3 Drawing Sheets

METHOD FOR PREVENTING VERIFICATION FLAW BY CONTROLLING SESSION TIME AND SESSION DATA TRAFFIC

FIELD OF THE INVENTION

The present invention relates to a method for preventing a verification flaw by controlling a session time and a session data traffic. More particularly, the invention relates to a technique whereby a networking equipment records a session time and a session data traffic of a terminal device trying to connect to the Internet through the networking equipment, and whereby the networking equipment cuts off connection with the terminal device when either the session time or the session data traffic exceeds its upper limit, in order to ensure that full network services are accessible to the terminal device only after the user completes a required verification process.

BACKGROUND OF THE INVENTION

Spurred by the rapid development of computer networks, commercial Internet service providers have grown rapidly in recent years and, in addition to World Wide Web (WWW) services, have begun to provide such network services as network searching, online gaming, network banking, e-mail, digital file transfer through the File Transfer Protocol (FTP), the Bulletin Board System (BBS), and text-oriented communication through the Telnet protocol. Today, thanks to the widespread availability of such network services, people are used to acquiring all sorts of information through the Internet to meet the various needs in their daily lives or at work.

In light of the fact that computer networks have become indispensable tools for not a few, many public places provide access to wireless networks either on payment or free of charge. And from a consumer's perspective, "free wireless networking" has been a major factor in deciding whether or not to patronize a restaurant, coffee shop, hotel, or store. By providing free wireless networking, however, the owner of a place of business expects something in return. For instance, a shop providing free wireless network services may give preferential treatment (e.g., free food offering or a discount) to, and thereby encourage, those who "check into" the shop publicly via a social networking website such as Facebook, Twitter, or Plurk, with a view to the potential advertising effect.

Moreover, with the development of the concept of Big Data, more and more shops have learned to achieve success of advertisement by means of consumers' "network identities" on social networking websites. For example, a shop owner may know a consumer's interests and needs by the consumer's personal data on a social networking website and can therefore target the consumer for sales promotion. This is why many shops that provide free wireless networking require customers to complete a verification process (e.g., logging on to a Facebook account) before they can access free wireless networks. The verification process allows the shops to record the types of their customers so that sales strategies can be adjusted or advertisement, sent out whenever needed.

In order for a consumer to verify their network identify, a shop must create a walled garden in its networking equipment in advance, wherein the walled garden stores the address of a social networking website (e.g., Facebook). When a consumer's terminal device is connected to the networking equipment and requests access to network services, the networking equipment starts by allowing the terminal device to access only the social networking website whose address is stored in the walled garden. Then, the networking equipment requests the consumer to perform a verification process. The networking equipment will not make all its network functions available until a confirmation message indicating "verification completed" is received from the social networking website.

The foregoing verification process, however, has a flaw. If a consumer only needs to use the functions of that social networking website (e.g., browsing Facebook pages that are open to the public) but not the functions of other external networks (e.g., receiving or sending e-mails, or browsing a video website), he or she can do so without verification. The issue to be addressed by the present invention is to provide an easy-to-implement method that can prevent this flaw in verification effectively.

BRIEF SUMMARY OF THE INVENTION

As stated above, even though a shop providing free network services may require its customers to complete a verification process before they are given full access to the services, one may still take advantage of the aforesaid flaw in verification and directly browse a social networking website without going through the verification process. In view of this, the inventor of the present invention put years of practical experience into extensive research, thorough evaluation, and repeated tests and finally succeeded in developing a method for effectively preventing the verification flaw by controlling a session time and a session data traffic as disclosed herein.

It is an objective of the present invention to provide a method for preventing a verification flaw by controlling a session time and a session data traffic. The method is applicable to a networking equipment that stores a list of verified terminal devices, a temporary permit list, a walled garden, an upper limit of time, and a data traffic quota, wherein the walled garden stores the social networking website address of at least one social networking website server. The networking equipment starts a verification process after receiving a request from a terminal device and determining that the media information of the terminal device has yet to be recorded on the list of verified terminal devices. The method includes the steps, to be performed by the networking equipment during the verification process, of: adding the media information to the temporary permit list, and starting to record a session time and a session data traffic, wherein the session time refers to the time for which the terminal device has been connected to the networking equipment while the session data traffic refers to the amount of data transmitted by the networking equipment to the terminal device; receiving a frame from the terminal device, and updating the session data traffic according to the amount of data in reply to the frame; sending the frame to the target address of the frame when, and only when, it is determined by the networking equipment that the session time does not exceed the upper limit of time, that the session data traffic does not exceed the data traffic quota, and that the target address of the frame corresponds to one of the at least one social networking website address in the walled garden; and receiving a confirmation message from the social networking website server corresponding to the social networking website address to which the target address of the frame corresponds, and recording the media information on the list of verified terminal devices to conclude the verification process. With the networking equipment monitoring the session time and session data traffic of the terminal device continually while the terminal device undergoes verification, the user of the terminal device is easily and effectively prevented from using the social networking website intended for verification without actually completing the verification process after the terminal device is connected through the networking equipment to the corresponding social networking website server.

BRIEF DESCRIPTION OF THE SEVERAL VIEWS OF THE DRAWINGS

The technical features, process flow, and objectives of the present invention can be better understood by referring to the following detailed description in conjunction with the accompanying drawings, in which.

DETAILED DESCRIPTION OF THE INVENTION

Figure 1:
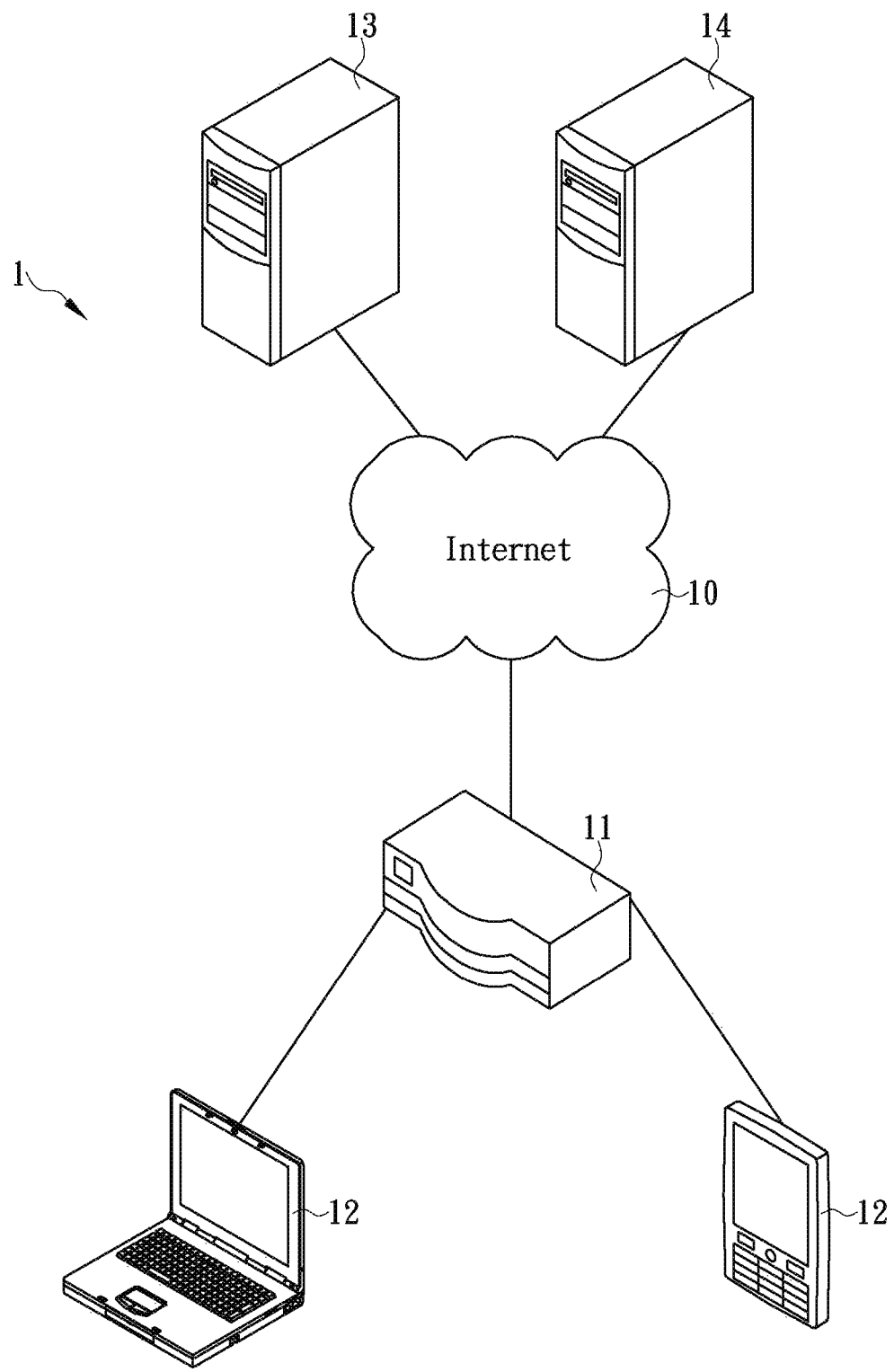
FIG. 1 is a schematic drawing of a system to which the present invention is applied.
Figure 2:
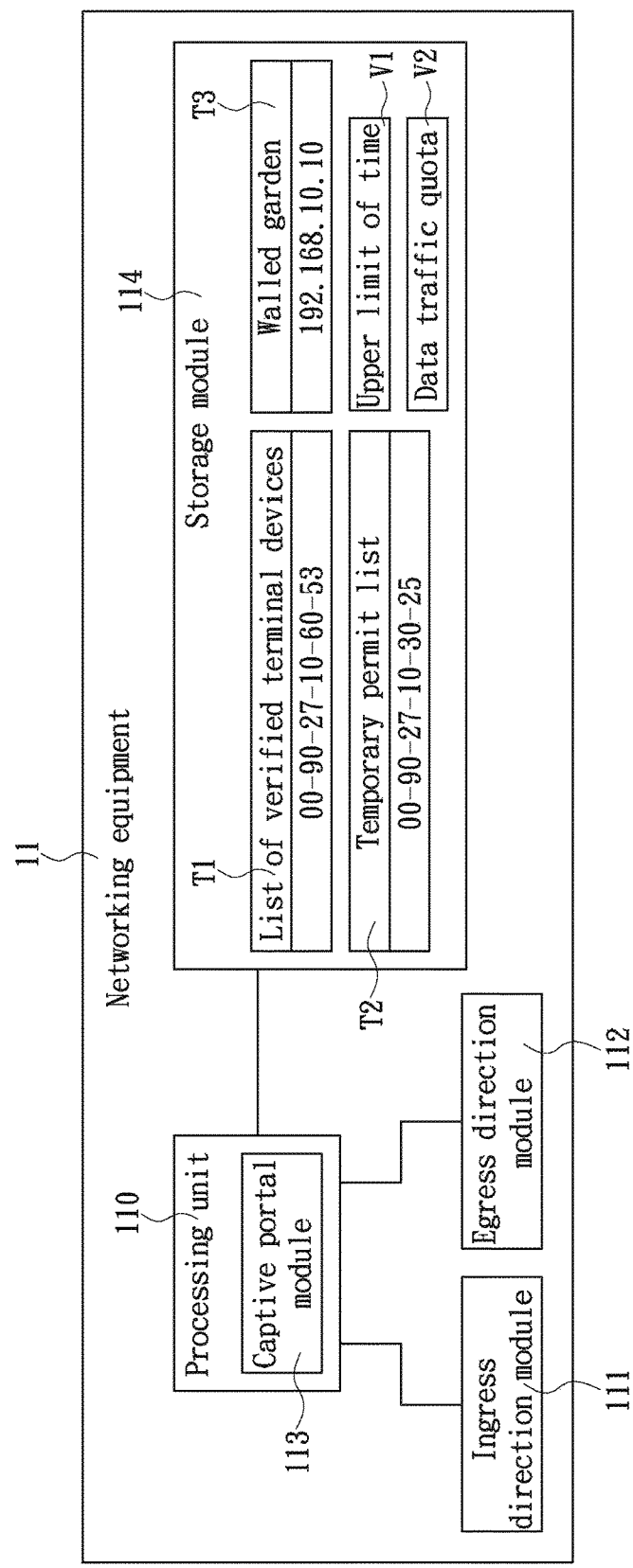
FIG. 2 schematic shows a networking equipment to which the present invention is applied.

The present invention provides a method for preventing a verification flaw by controlling a session time and a session data traffic. Referring to FIG. 1 and FIG. 2, the method is applied to a network system 1 that includes a networking equipment 11, a plurality of terminal devices 12, a social networking website server 13, and a network server 14. The networking equipment 11 may be a gateway/router at a place of business such as a restaurant, coffee shop, or hotel. The social networking website server 13 is a server of a social networking website such as Facebook, Twitter, or Plurk.

The networking equipment 11 at least includes a processing unit 110, an ingress direction module 111, an egress direction module 112, and a storage module 114, wherein the processing unit 110 is provided therein with a captive portal module 113. When the terminal devices 12 are connected to the networking equipment 11, the networking equipment 11 can receive data through the ingress direction module 111 and send data through the egress direction module 112.

The storage module 114 of the networking equipment 11 stores a list of verified terminal devices T1, a temporary permit list T2, a walled garden T3 (including the website address of Facebook for example), an upper limit of time V1 (e.g., 5 minutes), and a data traffic quota (e.g., 10 MB). The walled garden T3 stores the social networking website address of at least one social networking website server 13 (e.g., 192.168.10.10).

When any of the terminal devices 12 is connected to the networking equipment 11, a request for access to the network services provided by the networking equipment 11 is sent by the terminal device 12 to the networking equipment 11. Upon receiving the request, the networking equipment 11 determines whether the media information (e.g., the media access control address, or MAC address) of the terminal device 12 is already recorded on the list of verified terminal devices T1. If, referring to FIG. 2 in conjunction with FIG. 1, the media information of the terminal device 12 (e.g., "00-90-27-10-60-53") is on the list of verified terminal devices T1, meaning there is a verification record of the terminal device 12, full access to the network services is granted to the terminal device 12 directly.

Figure 3:
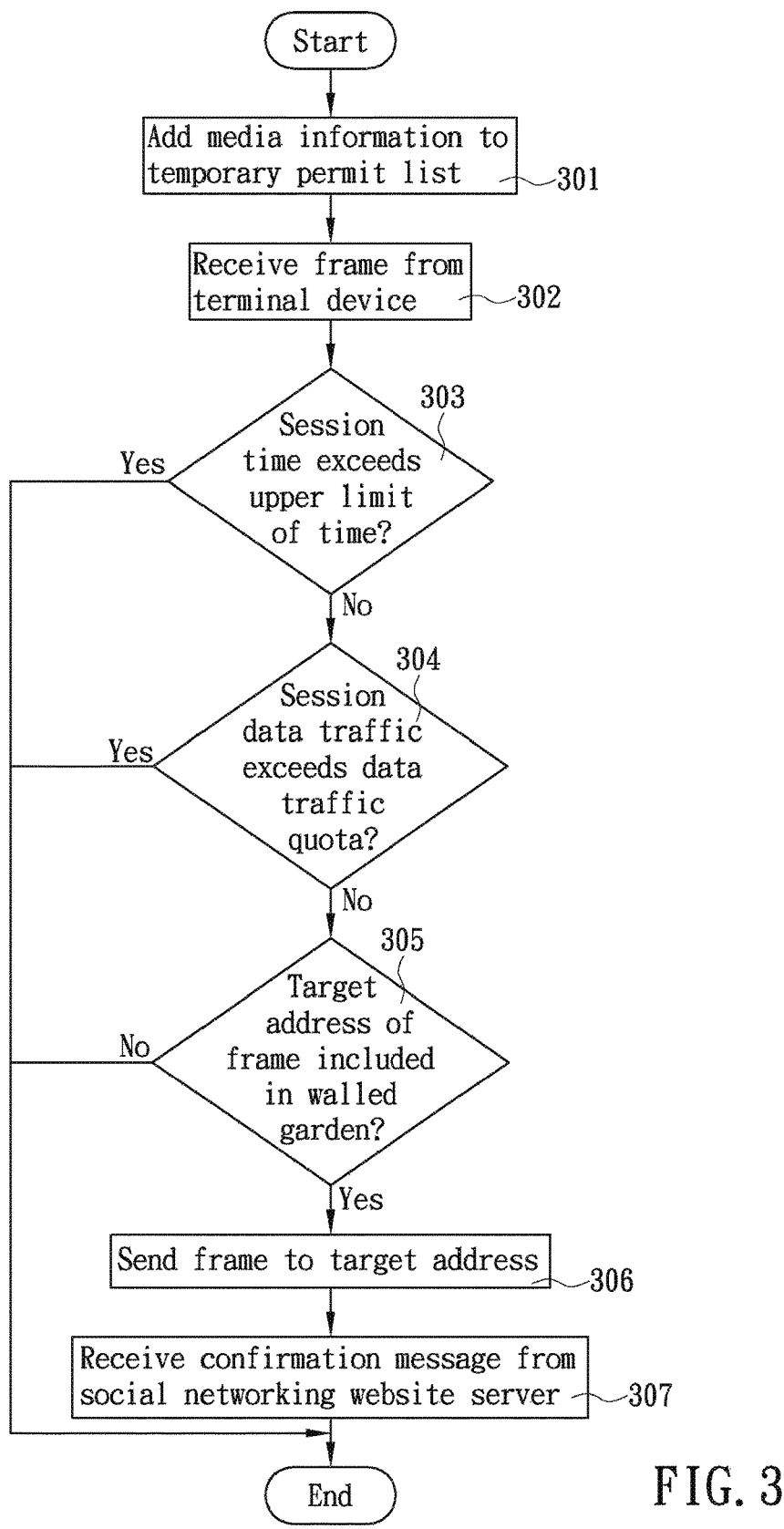
FIG. 3 is a flowchart of the method in a preferred embodiment of the present invention.

Conversely, if it is determined by the networking equipment 11 that the media information of the terminal device 12 (e.g., "00-90-27-10-30-25") is not on the list of verified terminal devices T1, the networking equipment 11 will start a verification process and guide the following process flow to the captive portal module 113. Hereinafter, a detailed description of the method of the present invention, or more particularly of the steps to be performed by the networking equipment 11, is provided with reference to FIG. 1 to FIG. 3:

(301) To begin with, the networking equipment 11 adds the media information to the temporary permit list T2 and starts recording a session time and a session data traffic. The session time refers to the time for which the terminal device 12 has been connected to the networking equipment 11. The session data traffic refers to the amount of data transmitted by the networking equipment 11 to the terminal device 12.

(302) After that, the networking equipment 11 receives a frame from the terminal device 12 and updates the current session data traffic according to the amount of data in reply to the frame (i.e., the amount of data the networking equipment 11 has sent to the terminal device 12 in reply to the frame, e.g., 2 MB).

(303) The networking equipment 11 determines whether the session time exceeds the upper limit of time V1. If yes, the networking equipment 11 stops the ongoing process, cuts off the connection between the networking equipment 11 and the terminal device 12, and removes the media information of the terminal device 12 from the temporary permit list T2; if no, step (304) is performed.

(304) The networking equipment 11 determines whether the session data traffic exceeds the data traffic quota V2. If yes, the networking equipment 11 stops the ongoing process, cuts off the connection between the networking equipment 11 and the terminal device 12, and removes the media information of the terminal device 12 from the temporary permit list T2; if no, step (305) is carried out.

(305) The networking equipment 11 determines whether the target address of the frame corresponds to any social networking website address in the walled garden T3. If no, the networking equipment 11 stops processing the frame; if yes, the process continues to step (306).

(306) The networking equipment 11 sends the frame to the target address through the Internet 10. If any data are sent by the networking equipment 11 to the terminal device 12 during steps (303) to (305), the networking equipment 11 will update the session data traffic in real time.

(307) The networking equipment 11 receives a confirmation message from the social networking website server 13 corresponding to the social networking website address to which the target address corresponds. Then, the networking equipment 11 completes the verification process by recording the media information on the list of verified terminal devices T1. When the terminal device 12 sends another frame to the networking equipment 11 at a later time, the networking equipment 11 will skip the determination steps described above and relay the frame instantly, allowing the terminal device 12 to connect to the network server 14 (e.g., an e-mail server, a video website server, or the like) freely through the networking equipment 11 and the Internet 10.

As the networking equipment 11 monitors the session time and session data traffic of the terminal device 12 continually while the terminal device 12 is under verification, the user of the terminal device 12 is kept from using the social networking functions of the social networking website server 13 (which is intended for verification in the first place) indefinitely without performing the required verification process after the terminal device 12 is connected to the social networking website server 13 through the networking equipment 11. This ensures that the networking equipment 11 will not provide network services to the user of the terminal device 12 without collecting the latter user's personal data in return, and the verification flaw of the prior art is thus prevented. Instead of determining "whether a frame is intended for verification", the method of the present invention limits the networking functions according to the "session time" and the "session data traffic" and is therefore easy to perform and effective in controlling the networking functions of an "unverified terminal device 12" as a way to protect the networking equipment 11 from overloading.

It should be pointed out that the networking equipment 11 in this embodiment does not determine whether the target address of the frame corresponds to any social networking website address in the walled garden T3 until it is determined that the session time does not exceed the upper limit of time V1 and that the session data traffic does not exceed the data traffic quota V2. In practice, however, the three determination steps (303) to (305) may be carried out in an arbitrary order. In other words, the networking equipment 11 may determine whether the target address of the frame corresponds to any social networking website address in the walled garden T3 before comparing the session time and the session data traffic with their respective criteria. In any case, the networking equipment 11 sends the frame to the target address only when the requirements of all the three determination steps are satisfied.

In this embodiment, referring back to FIG. 1 and FIG. 2, the walled garden T3 may store the social networking website addresses of a plurality of social networking website servers 13 (e.g., Facebook and Twitter), and in that case, the networking equipment 11 will generate a selection page (e.g., "To verify your terminal device through Facebook or Twitter?") according to the social networking website addresses prior to the verification process. Once the selection page is sent to and received by the terminal device 12, the terminal device 12 can generate a request (e.g., to verify through Facebook) corresponding to one of the social networking website addresses and send the request to the networking equipment 11.

Continued from above, the networking equipment 11 may store a plurality of upper limits of time V1 and a plurality of data traffic quotas V2 that correspond to the social networking website addresses of the plural social networking website servers 13 respectively. For example, the upper limit of time V1 and the data traffic quota V2 are "5 minutes and 15 MB" when the verification process is performed through Facebook, and "2 minutes and 12 MB" when the verification process is performed through Plurk. After receiving the request of the terminal device 12, the networking equipment 11 finds the upper limit of time V1 and the data traffic quota V2 corresponding to the social networking website address in the request in order to carry out the various determination steps in the verification process and thereby precisely control the networking functions to be allocated to the terminal device 12.

To better prevent the aforesaid flaw of the verification process, step (305) may include the networking equipment 11 directly discarding the frame upon determining that the target address of the frame does not correspond to any social networking website address in the walled garden T3. After discarding the frame, the networking equipment 11 may further find from the walled garden T3 the social networking website address of the social networking website server 13 through which the user of the terminal device 12 chose to verify the terminal device 12 at the very beginning (e.g., to verify through Facebook). Then, the networking equipment 11 obtains a verification page from the social networking website server 13 and sends the verification page to the terminal device 12. If the user of the terminal device 12 tries to use other networking functions (e.g., connecting to a video website) than the verification function before the required verification process is completed, the networking equipment 11 will ignore any such request and redirect the terminal device 12 to the verification page provided by the foregoing social networking website server 13 instead (e.g., display the login page of Facebook).

While the invention herein disclosed has been described by means of specific embodiments, numerous modifications and variations could be made thereto by those skilled in the art without departing from the scope of the invention set forth in the claims.

What is claimed is:

1. A method for preventing a verification flaw by controlling a session time and a session data traffic, wherein the method is applicable to a networking equipment; the networking equipment stores a list of verified terminal devices, a temporary permit list, a walled garden, an upper limit of time, and a data traffic quota; and the walled garden stores a social networking website address of at least one social networking website server; the method comprising the steps, to be performed in a verification process started by the networking equipment after the networking equipment receives a request from a terminal device and determines that media information of the terminal device has yet to be recorded on the list of verified terminal devices, of:

adding the media information to the temporary permit list, and starting to record a session time and a session data traffic, wherein the session time refers to a time for which the terminal device has been connected to the networking equipment, and the session data traffic refers to a total amount of data transmitted by the networking equipment to the terminal device;

receiving a frame from the terminal device, and updating the session data traffic according to a total amount of data in reply to the frame;

sending the frame to a target address of the frame when, and only when, it is determined by the networking equipment that the session time does not exceed the upper limit of time, that the session data traffic does not exceed the data traffic quota, and that the target address of the frame corresponds to a said social networking website address in the walled garden; and receiving a confirmation message from the social networking website server corresponding to the social networking website address to which the target address of the frame corresponds, and recording the media information on the list of verified terminal devices to complete the verification process.

2. The method of claim 1, wherein the walled garden stores said social networking website addresses of a plurality of said social networking website servers, and the method further comprises the steps, to be performed by the networking equipment prior to the verification process, of:

generating a selection page according to the social networking website addresses; and sending the selection page to the terminal device in order for the request generated and sent by the terminal device to the networking equipment after receiving the selection page to correspond to one of the social networking website addresses.

3. The method of claim 2, wherein the networking equipment stores a plurality of said upper limits of time corresponding respectively to the social networking website addresses of the social networking website servers and a plurality of said data traffic quotas corresponding respectively to the social networking website addresses of the social networking website servers, and the method further comprises the step, to be performed by the networking equipment in order to perform the verification process, of:
finding a said upper limit of time corresponding to a social networking website address in the request and a said data traffic quota corresponding to the social networking website address in the request.

4. The method of claim 3, wherein the networking equipment determines whether or not the target address of the frame corresponds to a said social networking website address in the walled garden after, and only after, it is determined that the session time does not exceed the upper limit of time found and that the session data traffic does not exceed the data traffic quota found.

5. The method of claim 1, further comprising the step, to be performed by the networking equipment upon determining that the target address of the frame does not correspond to any said social networking website address in the walled garden, of discarding the frame directly.

6. The method of claim 2, further comprising the step, to be performed by the networking equipment upon determining that the target address of the frame does not correspond to any said social networking website address in the walled garden, of discarding the frame directly.

7. The method of claim 3, further comprising the step, to be performed by the networking equipment upon determining that the target address of the frame does not correspond to any said social networking website address in the walled garden, of discarding the frame directly.

8. The method of claim 4, further comprising the step, to be performed by the networking equipment upon determining that the target address of the frame does not correspond to any said social networking website address in the walled garden, of discarding the frame directly.

9. The method of claim 5, further comprising the steps, to be performed by the networking equipment after determining the target address of the frame does not correspond to any said social networking website address in the walled garden and hence discarding the frame, of:
obtaining a verification page from the social networking website server corresponding to a said social networking website address in the walled garden; and
sending the verification page to the terminal device.

10. The method of claim 6, further comprising the steps, to be performed by the networking equipment after determining the target address of the frame does not correspond to any said social networking website address in the walled garden and hence discarding the frame, of:
obtaining a verification page from the social networking website server corresponding to a said social networking website address in the walled garden; and
sending the verification page to the terminal device.

11. The method of claim 7, further comprising the steps, to be performed by the networking equipment after determining the target address of the frame does not correspond to any said social networking website address in the walled garden and hence discarding the frame, of:
obtaining a verification page from the social networking website server corresponding to a said social networking website address in the walled garden; and
sending the verification page to the terminal device.

12. The method of claim 8, further comprising the steps, to be performed by the networking equipment after determining the target address of the frame does not correspond to any said social networking website address in the walled garden and hence discarding the frame, of:
obtaining a verification page from the social networking website server corresponding to a said social networking website address in the walled garden; and
sending the verification page to the terminal device.

\* \* \* \* \*